United States Patent [19]

Fujii

[11] Patent Number: 5,571,473

[45] Date of Patent: Nov. 5, 1996

[54] PROCESS FOR THERMOFORMING THERMOPLASTIC RESIN SHEET

[75] Inventor: Atsushi Fujii, Himeji, Japan

[73] Assignee: Idemitsu Petrochemical Co., Ltd., Tokyo, Japan

[21] Appl. No.: 215,674

[22] Filed: Mar. 22, 1994

Related U.S. Application Data

[63] Continuation of Ser. No. 905,406, Jun. 29, 1992, abandoned, which is a continuation-in-part of Ser. No. 627,838, Dec. 17, 1990, abandoned.

[30] Foreign Application Priority Data

Dec. 28, 1989 [JP] Japan .................... 1-342392

[51] Int. Cl.$^6$ .................... B29C 51/10; B29C 51/42
[52] U.S. Cl. .................... 264/510; 264/458; 264/512; 264/522; 425/174.4; 425/384
[58] Field of Search .................... 264/25, 327, 510, 264/512, 522, DIG. 65, 458; 425/174.4, 384

[56] References Cited

U.S. PATENT DOCUMENTS

| | | |
|---|---|---|
| 2,900,665 | 8/1959 | Walker . |
| 3,746,497 | 7/1973 | Neil . |
| 4,778,372 | 10/1988 | Mutti et al. .................... 425/174.4 |
| 4,909,722 | 3/1990 | Wakayama et al. .................... 425/384 |

FOREIGN PATENT DOCUMENTS

| | | |
|---|---|---|
| 0055082 | 6/1982 | European Pat. Off. . |
| 2134108 | 3/1972 | Germany .................... 264/522 |
| 2161272 | 6/1973 | Germany .................... 425/384 |
| 2600582 | 7/1977 | Germany . |
| 3334670 | 4/1985 | Germany . |
| 52-040570 | 9/1975 | Japan .................... 264/522 |

*Primary Examiner*—Catherine Timm
*Attorney, Agent, or Firm*—Antonelli, Terry, Stout & Kraus

[57] ABSTRACT

A process for producing a formed article by heating a thermoplastic resin sheet and then thermoforming a part to be formed involves heating the part to be formed by placing in contact with a heating plate while at least a part of a non-formed part of the thermoplastic resin sheet is not heated by placing in contact with the heating plate, and then heating the part to be formed and at least a part of the non-formed part by placing them in a non-contact state with a heating means is disclosed.

9 Claims, 1 Drawing Sheet

PROCESS FOR THERMOFORMING THERMOPLASTIC RESIN SHEET

This application is a Continuation application of Ser. No. 905,406, filed Jun. 29, 1992, now abandoned, which application is a Continuation-In-Part application of Ser. No. 627,838, filed Dec. 17, 1990, now abandoned.

BACKGROUND OF THE INVENTION

1. Field of the Invention

The present invention relates to a process for thermoforming a thermoplastic resin sheet and an apparatus therefor, and particularly it relates to a process for effectively preparing a variety of formed articles such as a container or the like by heating a thermoplastic resin sheet to thermoform a formed part and a production apparatus thereof. 2. Description of the Related Arts There have previously been produced formed articles such as containers having a variety of shapes by heating a thermoplastic resin sheet such as an olefinic resin sheet and then thermoforming a formed part with a forming die. As the means for heating the thermoplastic resin sheet in the apparatus for thermoforming, there are known an indirect heating method of heating the sheet by keeping it out of contact with a heating source (Japanese Utility Model Laid-Open Publication No. 134218/1980) and a direct method for heating the sheet by directly placing it in contact with a heating source such as a heating plate or the like (Japanese Utility Model Laid-Open Publication Nos. 99765/1976 and 35962/1978, Japanese Utility Model Publication No. 21399/1988 etc.).

However, according to the aforementioned heating method, corrugation is caused due to the thermal expansion of the sheet during the former half of the heating step which inhibits uniform heating of the sheet, and the drawdown following corrugation is also large. Thus, a special thermoplastic resin sheet having extremely small values of corrugation and drawdown must be used or a sheet having a small width must be used for performing a good forming.

On the other hand, the direct heating method at a heating temperature in the vicinity of and below the sheet melting point often causes wrinkle due to the thermal expansion or drawdown of the sheet or transfer of the heating plate impression, which leads to an inferior appearance of the formed product. Although heating at a temperature below the aforementioned heating temperature causes no wrinkle, impression transfer to, or fusing of the sheet, defective formings are often produced and the heat resistance of the formed product obtained is insufficient unless forming is conducted at an extremely high pressure. Moreover, heating at a temperature higher than the melting point of the sheet causes wrinkle, fusing or impression transfer, and thus special sheets must be used. However, such sheets were successful in the prevention of wrinkle or fusing, but they could not avoid diminishing the gloss of the surface.

SUMMARY OF THE INVENTION

Thus, the present inventor examined various conditions of heating a thermoplastic resin sheet for the purpose of solving the aforementioned problems and conducted earnest research in order to develop a process for efficiently thermoforming.

As a result, the present inventor has found that a formed article with excellent appearance and physical properties can be efficiently produced even from crystalline resins such as polyolefins having a narrow temperature range in which forming can be performed, for example, polyethylene, polypropylene, polystyrene or the like by conducting pressure forming of a sheet having been heated under a specific condition. The present invention has thus been accomplished on the basis of such finding.

That is, the present invention provides a process for producing a formed article by heating a thermoplastic resin sheet and then thermoforming a part to be formed, wherein the part to be formed is heated by placing in contact with a heating plate while at least some non-formed part of the thermoplastic resin sheet is not heated by placing in contact with a heating plate, and then said part to be formed and at least a part of said non-formed part are heated together by placing them in a non-contact state with a heating means. The present invention also provides a thermoforming apparatus for producing a formed article by heating a thermoplastic resin sheet with a heating device and then thermoforming a part to be formed with a forming die, wherein the heating device is provided with a direct heating part having a heating plate which is directly contacted with the part to be formed of the thermoplastic resin sheet and a non-contact heating part which is provided between the direct heating part and the forming die and works for heating the entire thermoplastic resin sheet in a non-contact state.

Figure 1:
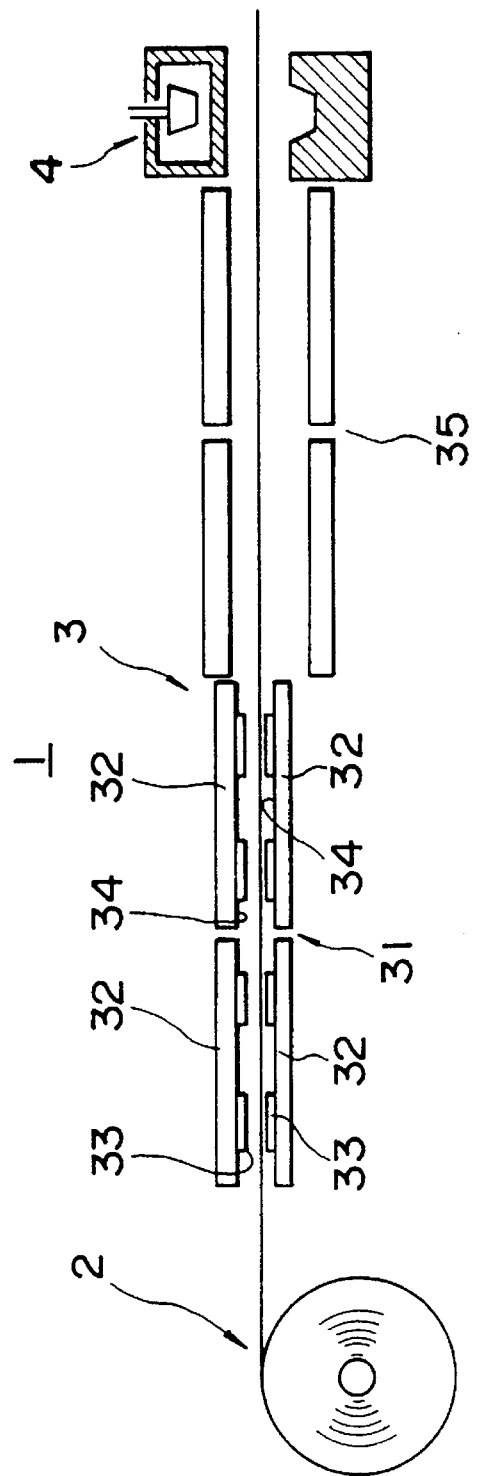
FIG. 1 is a front view of a thermoforming apparatus.

1: thermoforming apparatus,
2: sheet feeding part,
3: heating device,
31: direct heating part,
32: heating plate,
33: heating face,
34: non-contact face,
35: indirect heating part,
4: forming die

DESCRIPTION OF THE PREFERRED EMBODIMENTS

As described above, according to the present invention, the part to be formed of the thermoplastic sheet is first heated preferably by directly heating both sides in contact with the heating plate, then indirectly heating the entire sheet and forming the sheet thus heated with the forming die. Thus, it will be possible to efficiently thermoform a variety of thermoplastic resins, crystalline resins, laminated or coextruded films thereof such as polyolefins, for example, polyethylene, polypropylene, polystyrene or the like.

The present invention is explained in more detail with reference to an example of the apparatus for thermoforming a thermoplastic resin sheet illustrated in the drawings.

Figure 2:
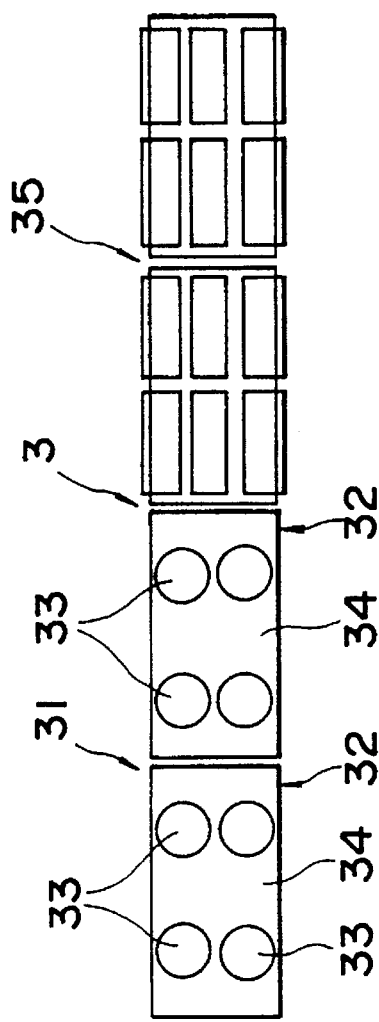
FIG. 2 is a plane view illustrating the lower half of the heating apparatus.

FIG. 1 is a front view of a thermoforming apparatus and FIG. 2 is a plane view illustrating the lower half of the heating apparatus.

The thermoforming apparatus 1 is composed of a sheet feeding part 2, a heating device 3 and a forming die 4, and the heating device 3 is constituted of a direct heating part 31 at the first half stage and an indirect heating part 35 at the latter stage.

The aforementioned direct heating part 31 is for heating the part to be formed of the thermoplastic resin sheet by contacting it with the heating plates and is provided with a pair of upper and lower heating plates 32 which travel up and down along with the conveyance of the sheet and are provided with the heating faces 33 for directly heating the part to be formed locally so that they protrude from the non-contact faces corresponding to the non-formed parts of the sheet. The heating faces 33 can be fabricated with a metal which is conventionally used for such heating faces, and a TEFLON (trademark for fluorine-containing polymers) coating or a TEFLON cloth can be applied to the surface. Furthermore, from an effective heating viewpoint, the sheet is heated preferably by heat transfer to the sheet in-between the heating faces 33 on the pair of the upper and lower heating plates 32. If the sheet can be satisfactorily heated in a tight contact with the heating faces 33, it is sufficient that the heating plates 32 are provided on either one of the upper or lower sides.

While the temperature of the heating face 33 can be appropriately controlled depending on the materials or thickness of the sheet, the desired heat resistance or gloss of a formed product, the upper limit of the temperature is generally determined so that the fusing of the sheet does not occur. For example, the temperature of the heating face is in the range of 80° to 140° C. for sheets of conventional polypropylenes. The heating plate 32 must have a shape consisting of a contact part which can satisfactorily heat the part of the sheet to be formed and a non-contact part which will not contact with the non-formed part, and the heating plate may be contacted a plurality of times with the part to be formed along with the conveyance of the sheet. As the direct heating device, there can be used a direct heating device which is disclosed in Japanese Utility Model Publication No. 21399/1988.

The indirect heating part 35 in the latter stage of the heating device can be fabricated in a similar manner as conventional heating devices which heat the entire sheet with heat sources such as a far-infrared heater or an infrared heater having a short or medium wave length. The heating temperature is set up depending on the materials or thickness of the sheet or the desired physical properties of a formed product, and the upper limit of the temperature is determined by the presence of the drawdown. For example, the heating temperature is in the range of 150° to 180° C. for sheets of conventional polypropylenes. When emphasis is put on transparency, it is preferable in the range of the melting point or less. It is preferable in the range of 180° C. or less for a polypropylene sheet having a nucleating agent added thereto. Heating sources may be arranged on the both sides or on either one side provided that the sheet can be sufficiently heated.

Thus, the direct heating of the part to be formed of the sheet at the first half stage and the indirect heating of the entire sheet at the latter stage permit the sheet to be heated to an appropriate temperature required for pressure forming in a forming die 4 while suppressing the generation of the drawdown, wrinkle, fusing or impression transfer. At the first half stage, no wrinkle or fusing of sheet are found since the heating at this stage is only a preliminary heating, that is, heating at a low temperature is satisfactory due to heating at the latter stage. At the latter stage, no wrinkle is found because of the absence or only a small amount of the drawdown, and no impression transfer from the heating plate will be caused because the heating is in a non-contact state. Only a small amount of drawdown is believed to take place since the relationship of heating at the first half stage is maintained also at the latter stage, and thus the sheet is maintained by the non-contact region at the first half stage (the region at a temperature lower than the part to be formed).

As the forming die 4, any of various forming dies which have been conventionally used for thermoforming thermoplastic resins can be used depending on the shapes of the formed products, and a variety of means such as a plate forming, a roll forming, a vacuum forming, a pressure forming, a plug assist forming, a non-plug assist forming or the like can be employed.

As described above, a variety of formed products such as containers which have an extremely small amount of drawdown and have excellent form reproduction ability, surface gloss, appearance, heat resistance or the like can be produced at a high speed and with a wide sheet, and production at a high efficiency can be performed. Such production requires no special apparatus and can be performed with a simple apparatus. It can be used widely for thermoforming a variety of thermoplastic resin sheets.

In particular, many benefits can be expected from applying the process of the present invention to thermoforming crystalline resins such as polyolefin, for example, polyethylene, polypropylene, polystyrene or the like or laminated or multilayered films thereof.

The process of the present invention is further explained with reference to Examples and Comparative Examples.

EXAMPLE 1

As a sheet rollstock, a coextruded sheet comprising polypropylene (PP)/ethylene vinylalcohol (EVOH)/polypropylene (PP)/high density polyethylene (HDPE) and having a thickness of 800 μm (trade name: Idemitsu MAGICTOP Sheet) was used, a dessert container having a diameter of 65 mm and a depth of 25 mm was produced with a thermoforming apparatus 1, as described above, comprising a sheet feeding part 2, a heating device 3 which comprises a direct heating part 31 at the first half stage and an indirect heating part 35 at the latter stage, and a forming die 4. Heating was conducted at 110° C. at the heating face of the upper side and at 150° C. at the heating face of the lower side of the direct heating part 31 and at an environmental temperature of the heating source of 300° C. Furthermore, as the forming die 4, a plug-assisted pressure forming type was used by pressure for forming of 3 kg/cm$^2$ and a forming cycle of 20 shots/min.

The maximum amount of drawdown on thermoforming, form reproduction ability, presence of bridge, gloss or heat resistance of a container obtained were evaluated. The results are shown in Table 1 together with the heating conditions.

EXAMPLES 2 TO 4

Containers were produced in the same manner as Example 1 except that a monolayer sheet of polypropylene having a thickness of 600 μm (trade name: Idemitsu PURELAY Sheet) was used as a sheeting and heating was conducted at the temperatures of the heating faces in the upper and lower sides and at the environmental temperatures of the heating source. The results of evaluation are shown in Table 1.

EXAMPLE 5

A container was produced in the same manner as Example 1 except that heating was conducted only from the upper side at the indirect heating part 35 and at the environmental temperature at the heating source of 350° C. The results of evaluation are shown in Table 1.

COMPARATIVE EXAMPLES 1 TO 4

Containers were produced in the same manner as Example 2 except that the sheet was heated under the conditions described in Table 1. The results of evaluation are shown in Table 1.

TABLE 1

| No. | Sheet material fed | Direct heating part | | | Environmental temperature of heating source °(C.) |
|---|---|---|---|---|---|
| | | Temperature of heating plate | | Heating part | |
| | | Upper | Lower | | |
| Example 1 | Coextruded sheet*[1] | 110 | 150 | Part to be molded | 300 |
| Example 2 | Single layer sheet*[2] | 110 | 110 | Part to be molded | 300 |
| Example 3 | Single layer sheet*[2] | 150 | — | Part to be molded | 300 |
| Example 4 | Single layer sheet*[2] | — | 150 | Part to be molded | 300 |
| Example 5 | Single layer sheet*[2] | 110 | 110 | Part to be molded | 350 (upper side) |
| Comparative Example 1 | Single layer sheet*[2] | 110 | 110 | Entirety | 300 |
| Comparative Example 2 | Single layer sheet*[2] | 150 | 150 | Part to be molded | — |
| Comparative Example 3 | Single layer sheet*[2] | 150 | 150 | Entirety | — |
| Comparative Example 4 | Single layer sheet*[2] | — | — | — | 300 |

| No. | Thermomoldability | | State of container | | |
|---|---|---|---|---|---|
| | Amount of maximum drawdown*[3] (mm) | form reproducibility*[4] | Bridge*[4] | Gloss*[4] | Heat resistance*[4] |
| Example 1 | Substantially no drawdown | Good | None | Good | 145 |
| Example 2 | Substantially no drawdown | Good | None | Good | 130 |
| Example 3 | Substantially no drawdown | Good | None | Good | 130 |
| Example 4 | Substantially no drawdown | Good | None | Good | 130 |
| Example 5 | Substantially no drawdown | Good | None | Good | 130 |
| Comparative Example 1 | 5 to 10 | Good | Partly present | Good | 130 |
| Comparative Example 2 | 30 to 40 | Bad | Present | Bad | 90 |
| Comparative Example 3 | 40 to 50 | Bad | Present | Bad | 90 |
| Comparative Example 4 | 40 to 50 | Good | present | Bad | 130 |

*[1]PP/EVOH/PP/HDPE, 800 μm.
*[2]Polypropylene single layer sheet, 600 μm.
*[3]Amount of maximum drawdown was evaluated by the amount of drawdown of a sheet in a molding zone.
*[4]Form reproducibility, bridge and gloss were evaluated by naked eye.
*[5]Heat resistance was evaluated by the temperature where the shrinkage of a container was in the range of 30% or less after heating in an air oven for 30 minutes.

The following Table A shows the reason why the width of the neighboring portion to be heated is limited to 2 mm to 10 mm. In Table A, the experiments were conducted in the same manner as in the previous Examples of the present specification except that the conditions described in Table A were changed.

TABLE A

| | Sheet material fed | Direct heating part | | | Width of the neighboring portion to be heated |
|---|---|---|---|---|---|
| | | Temperature of heating plate | | Heating part | |
| | | Upper | Lower | | |
| Comparative Example A | Single layer sheet | 110° C. | 110° C. | part to be molded | 0 mm |
| Example A | Single layer sheet | 110° C. | 110° C. | part to be molded | 2 mm |
| Example B | Single layer | 110° C. | 110° C. | part to be | 10 mm |

TABLE A-continued

|  | Sheet material | Direct heating part | | |
|---|---|---|---|---|
|  |  | Temperature of heating plate | Heating | Width of the neighboring portion to |
| Comparative Example B | sheet Single layer sheet | 110° C. | 110° C. | molded part to be molded 15 mm |

|  | Environmental temperature of heating source | Thickness of top entrance part of container | Amount of maximum drawdawn (mm) |
|---|---|---|---|
| Comparative Example A | 300° C. | 450μ | Substantially no drawdown |
| Example A | 300° C. | 230μ | Substantially no drawdown |
| Example B | 300° C. | 220μ | Substantially no drawdown |
| Comparative Example B | 300° C. | 230μ | 5 to 10 |

(Note)

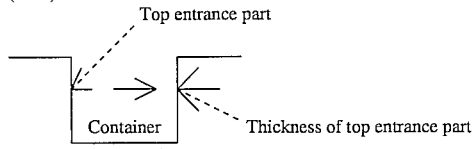

When the width of the neighboring part to be heated was less than 2 mm, the top entrance part of the container was not extended, thereby leaving the other part (the lower part) thin, which decreased the strength of the container. When the width of the neighboring part to be heated was more than 10 mm, the drawdown was increased and the same result as that in the entire heating was obtained. Therefore, the best results were obtained when the neighboring portion to be heated was 2 mm to 10 mm.

In a contact heating process of the first stage, an important feature of the present invention lies in heating said part of said resin sheet to be formed and the neighborhood (i.e. neighboring portion) of said part within the range of from at least 2 mm to 10 mm from said part by placing said part and said neighborhood in contact with heating plates while the remaining portion of the non-formed part of said sheet is not heated by not placing said sheet in contact with heating plates.

In short, an important feature of the present invention lies in heating the part to be formed and the neighborhood of said part (i.e. a neighboring portion) while the remaining portion of the non-formed part of said sheet is not heated, in a contact heating process of the first stage.

Owing to this important feature, the present invention provides the effects that (1) the sheet can be heated to an appropriate temperature required for pressure forming in a forming die while suppressing the generation of the drawdown, wrinkle, fusing or impression transfer, and that (2) an excellent formed article is obtained due to the good formability of the neighborhood of the part to be formed.

In contact heating, the sheet temperature (the temperature of the surface and the interior of the sheet) is usually in the range of 80° to 140° C.

As heretofore described, the heating plate may be contacted a plurality of times with the part to be formed along with the conveyance of the sheet. This disclosure indicates the following fact. The heating time should be prolonged for increasing the molding velocity. For increasing twice the molding velocity, for example, the portion to be formed is heated twice by contact heating.

In contact heating, the temperature of the heating face is in the range of 80° to 140° C. for sheet, wherein the sheet temperature is almost the same as the plate temperature.

In indirect heating, the heating temperature (sheet temperature) is in the range of 150° to 180° C.

What is claimed is:

1. In a process for producing a formed article by heating a thermoplastic resin sheet and then thermoforming a part of the sheet, the improvement which comprises heating said part to be thermoformed and an adjacent portion of another part of the resin sheet by placing said part and said adjacent portion in contact with a heating plate while a remaining portion of the thermoplastic resin sheet is not heated by contact with the heating plate, and then heating said part to be thermoformed, the adjacent portion and the remaining portion by placing the part to be thermoformed, said adjacent portion and the remaining portion in a non-contact state with a heating means; the part and the adjacent portion of the thermoplastic resin sheet heated with said heating plate being in a temperature range of 80° to 140° C. and said part and said portions subsequently heated in the non-contact state with said heating means being in a temperature range of 150° to 180° C.

2. A process for thermoforming a thermoplastic resin sheet according to claim 1, wherein both sides of the part to be thermoformed and the adjacent portion of the another part are heated by contacting with the heating plate.

3. A process for thermoforming a thermoplastic resin sheet according to claim 1, wherein only one side of the part to be thermoformed and the adjacent portion is heated by contacting with said heating plate.

4. A process for thermoforming a thermoplastic resin sheet according to claim 1, wherein said thermoplastic resin sheet is a laminated or coextruded sheet.

5. A process for thermoforming a thermoplastic resin sheet according to claim 4, wherein said laminated or coextruded sheet comprises PP/EVOH/PP/HDPE.

6. A process for thermoforming a thermoplastic resin sheet according to claim 1, wherein said thermoplastic resin sheet is a polypropylene sheet.

7. In a process for producing a formed article by heating a thermoplastic resin sheet and then thermoforming a part of the thermoplastic resin sheet, the improvement which comprises heating said part of said resin sheet to be thermoformed and a neighboring portion of said part within the range of from at least 2 mm to 10 mm from said part by placing said part and said neighboring portion in contact with at least one heating plate while a remaining portion of said thermoplastic resin sheet is not heated by contact with said at least one heating plate, and then heating said part, said neighboring portion and said remaining portion of said thermoplastic resin sheet by placing said part, said neighboring portion and said remaining portion in a non-contact state with a heating means; the part and the neighboring portion heated in contact with said at least one heating plate being in a temperature range of 80° to 140° C. and the part, the neighboring portion and the remaining portion heated subsequently in the non-contact state with said heating means being in a temperature range of 150° to 180° C.

8. A process for thermoforming a thermoplastic resin sheet according to claim 7, wherein both sides of the part to be thermoformed and the neighboring portion are heated simultaneously by contacting with two heating plates, one at each side of the thermoplastic resin sheet.

9. A process for thermoforming a thermoplastic resin sheet according to claim 7, wherein only one side of the part to be thermoformed and the neighboring portion is heated by contacting with said at least one heating plate.

* * * * *